US006433113B1

(12) United States Patent
Mukerjee et al.

(10) Patent No.: US 6,433,113 B1
(45) Date of Patent: Aug. 13, 2002

(54) RING-OPENING METATHESIS POLYMERIZATION (ROMP) OF CYCLO-OLEFINS WITH MOLYBDENUM CATALYSTS

(75) Inventors: Shakti L. Mukerjee, Louisville, KY (US); Vernon L. Kyllingstad, Floyds Knobs, IN (US)

(73) Assignee: Zeon Corporation, Tokyo (JP)

( * ) Notice: Subject to any disclaimer, the term of this patent is extended or adjusted under 35 U.S.C. 154(b) by 46 days.

(21) Appl. No.: 09/730,585

(22) Filed: Dec. 7, 2000

(51) Int. Cl.⁷ .............................. C08G 61/08; C08F 4/78
(52) U.S. Cl. .................. 526/160; 526/161; 526/169; 526/281; 526/283; 526/903; 502/117; 502/118; 502/154; 502/155; 502/161
(58) Field of Search ................................. 502/117, 118, 502/154, 155, 161; 526/160, 161, 169, 281, 283, 903

(56) References Cited

U.S. PATENT DOCUMENTS

| | | |
|---|---|---|
| 3,627,739 A | 12/1971 | Devlin et al. |
| 3,681,300 A | 8/1972 | Uraneck et al. |
| 3,859,265 A | 1/1975 | Hepworth |
| 4,021,510 A | 5/1977 | Ueshima et al. |
| 4,068,063 A | 1/1978 | Ikeda et al. |
| 4,104,325 A | 8/1978 | Ueshima et al. |
| 4,138,448 A * | 2/1979 | Minchak et al. ......... 526/169 X |
| 4,176,220 A | 11/1979 | Ikeda et al. |
| 4,357,449 A * | 11/1982 | Yi ........................... 526/169 X |
| 4,689,380 A | 8/1987 | Nahm |
| 4,696,985 A | 9/1987 | Martin |
| 4,727,125 A | 2/1988 | Nelson |
| 4,853,435 A | 8/1989 | Yamato et al. |
| 4,977,226 A | 12/1990 | Sugawara et al. |
| 5,082,909 A | 1/1992 | Bell |
| 5,319,042 A | 6/1994 | Bell |
| 5,599,882 A | 2/1997 | Nishi et al. |

FOREIGN PATENT DOCUMENTS

| WO | WO 98/21214 | 5/1998 |
|---|---|---|
| WO | WO 98/30557 | 7/1998 |

OTHER PUBLICATIONS

Bazan et al., *J. Am. Chem. Soc.*, 1990, 112, 8378.
Schrock et al., *J. Mol. Catal.* 1988, 46, 243.
Feldman et al., *Organometallics*, 1989, 8, 2260.
Schattenmann et al., *J. Am. Chem. Soc.*, 1996, 118, 3295.
Herrmann et al., *Angew. Chem Int. Ed. Engl.*, 1996, 35, 2805.
Tanaka et al., *Macromolecules*, 1987, 20, 2640.
Nguyen et al., *J. Am. Chem. Soc.*, 1993, 115, 9858.
Wu et al., *J. Am. Chem. Soc.*, 1992, 114, 146–151.
Scholl et al., *Org. Lett.*, 1999, 1, 953–956.
Herrmann et al., *Angew Chem. Int'l Ed. Engl.* 1996, 35, 1087.
Nakayama et al., *Chemistry Letters*, 1997, 861.
Herrmann et al., *Angew. Chem. Int. Ed., Engl.*, 1998, 37, 2490.
Scholl et al., *Tetrahedron Letters*, 1999, 40, 2247.
Murdzek et al., *Organometallics* 1987, 6, 1373–1374.
Nguyen et al., *J. Am. Chem. Soc.* 1993, 115, 9858–9859.
Grubbs, Commercialization of Polymers Meeting, San Francisco, California Sep. 1999.
Wu et al., *J. Am. Chem. Soc.*, 1992, 114, 146–151.

* cited by examiner

*Primary Examiner*—Fred Teskin
(74) *Attorney, Agent, or Firm*—Armstrong, Westerman & Hattori, LLP

(57) ABSTRACT

A polymerization system for ring opening polymerization of cycloolefins, comprising a catalyst [MoOX$_2$L$_2$], a Lewis acid as co-catalyst, and a chain-transfer agent,

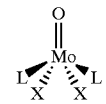

wherein (1) both X groups are the same halogen atom selected from the group consisting of Cl and Br, and both L groups are the same halogen atom as X; or (2) both of the X groups are the same halogen atom selected from the group consisting of Cl and Br, and both of the L groups are the same straight chain or branched alkyl group having 1–4 carbon atoms; or (3) both X groups are the same halogen atom selected from the group consisting of Cl and Br, and both L groups are the same straight chain or branched alkoxy group having 1–4 carbon atoms; or (4) both X groups are the same alkyl group having 1–4 carbon atoms, and both L groups are the same alkoxy group having 1–4 carbon atoms; or (5) one X group is a halogen atom selected from the group consisting of Cl and Br, and the other X group together with both L groups constitute a tridentate ligand; or (6) one X group is a straight chain or branched alkoxy group having 1–4 carbon atoms, and the other X group together with both L groups constitute a tridentate ligand.

44 Claims, No Drawings

RING-OPENING METATHESIS POLYMERIZATION (ROMP) OF CYCLO-OLEFINS WITH MOLYBDENUM CATALYSTS

BACKGROUND OF THE INVENTION

During the past several years catalyst development for metathesis polymerizations has surged. Most of these catalyst systems are well-defined organometallic complexes possessing a metal-carbon double bond (a metal carbene or a metal alkyledene) that can coordinate to the alkene moiety of the monomer and can perform the ring opening, particularly of cycloolefin monomers (COMs), in a rather facile manner. Most of the metals that demonstrate remarkable activity for this phenomenon are second- or third-row, mid- to late-transition metals. Although the reason for this phenomenon has not been clearly established, many theories have been advanced, the most prevalent being that late transition metals exhibit greater robustness than other transition metals towards impurities that may be inherently present in a polymerization system, and consequently can better resist degradation by those impurities.

In the case of COMs like norbornene (NB) that possess a highly strained double bond, the ring opened product is thermodynamically favored. Therefore, it is not necessary for the catalyst to possess a metal-carbene moiety in its structure to initiate the ROMP of NB. Any complex capable of initiating metal-carbene formation in situ should perform equally well as a catalyst for the ROMP. For instance, it is well known that $RuCl_3 \cdot 3H_2O$ can accomplish the ROMP of NB quite effortlessly, even though there is no carbene present in the catalyst. It is hypothesized that the reaction involves as a first step, when the metal halide reacts with the monomer, the formation of a metal-carbene moiety that is responsible for further polymer propagation.

The catalysts for olefin metathesis reactions that have received, by far, the highest exposure in the literature are those designed by:

(1) Richard Schrock's group (as reported in Bazan et al., *J Am. Chem. Soc.*, 1990, 112, 8378; Schrock et al., *J Mol. Catal.*, 1988, 46, 243; Feldman et al., *Organometallics*, 1989, 8,2260; Schattenmann et al., *J Am. Chem. Soc.*, 1996, 118, 3, 295; Murdzek et al., *Organometallics*, 1987, 6, 1373; and Murdzek et al.; *Macromolecules*, 1987, 20, 2640);

(2) Robert Grubbs's group (as reported in Nguyen et al.,. *J Am. Chem. Soc.*, 1993, 115, 9858; and Nguyen et al., *J Am. Chem. Soc.*, 1992, 114, 397; and WO98/2/4 (Grubbs et al.); and (3) Wolfgang Herrmann's group (as reported in Herrmann et al., *Angew. Chem. Int'l. Ed. Engl.*, 1996, 35, 1087).

The catalysts designed by the Grubbs group and the Herrmann group are based on ruthenium metal. These ruthenium complexes exhibit much more robustness in their handling than the Schrock complex based on molybdenum. These ruthenium complexes are stable in air, and do not degrade easily even when their solutions are exposed to the atmosphere for short intervals. Furthermore, they exhibit remarkable tolerance to impurities which may be inherent in polymerization systems, for example, moisture that may be present in solvents. Nevertheless, ruthenium complexes are more expensive than molybdenum, and the synthesis of these ruthenium complexes also requires some experimental manipulations using costly chemicals. The preparation of the starting material for synthesizing the Herrmann ruthenium complex, for instance, requires refluxing $RuCl_3 \cdot 3H_2O$ in isoprene for a fortnight. Similarly, the Grubbs ruthenium catalyst exhibits its highest activity only when $PCy_3$, which is an expensive phosphine, is coordinated to the metal center as an ancillary ligand.

The Schrock catalyst is a molybdenum complex, which clearly exhibits the highest ROMP activity of any complex that has been reported thus far. Although this molybdenum alkylidene complex is extremely versatile, one of its major drawbacks which does not make it commercially viable is the synthetic procedure for making it. The final product is obtained after several steps that require very stringent protocols. Furthermore, this molybdenum complex is extremely sensitive to air and/or moisture and, therefore, utmost care must be exercised in its handling. Solvents used in the experimental procedures have to be scrupulously monitored for impurities because even vestigial quantities can deactivate the catalyst.

As reported in Nakayama et al., *Chemistry Letters*, 1997, 861, the group led by A. Nakamura has discovered a tungsten complex which, when modified by coordination with a tridentate (O^N^O^) ligand, was able to perform the ROMP of NB in such a manner that the obtained polymer was predominantly cis-oriented (greater than 98%). However, this tungsten complex was active only in the presence of a Lewis acid, i.e., a dihalo aluminum alkyl compound as shown in the following equation. There was no mention of any catalytic activity that this combination of the tungsten complex and Lewis acid may have towards other COMs.

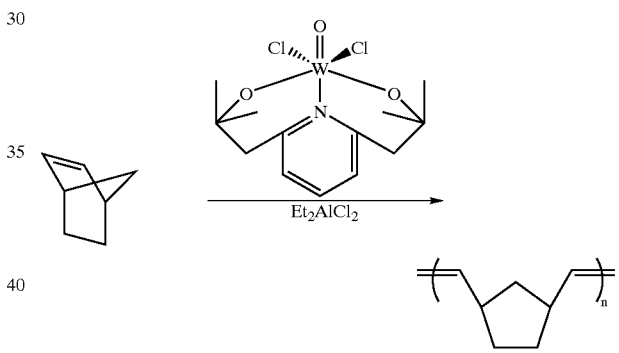

Recently, Herrmann et al. reported in *Angew. Chem. Int. Ed., Engl.*, 1998, 37, 2490, that their ruthenium complexes demonstrated a higher catalytic activity when an imidazolium carbene ligand represented by the following formula was coordinated to the ruthenium metal center.

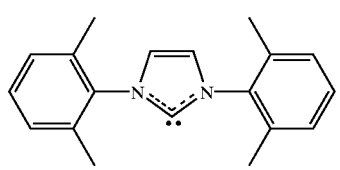

Finally, the Grubbs group has reported in Scholl et al., *Tetrahedron Letters*, 1999, 40, 2247; and in Grubbs, Presentation at the Commercialization of Polymers Meeting, San Francisco, Sep. 1999, that the use of the above carbene ligand to coordinate to the central ruthenium metal in place of one of the tri-cyclohexylphosphines in the Grubbs catalyst increased the overall potency of the catalyst for the ROMP of COMs.

In most instances, several synthetic steps are required to prepare the prior art catalyst complexes. These syntheses are interesting from an academic point of view. However, the industrial use of such catalysts may not always be commercially feasible because of economic considerations.

SUMMARY OF THE INVENTION

One aspect of the invention is to provide a polymerization system that exhibits outstanding reactivity in the ring-opening metathesis polymerization (ROMP) of cycloolefin monomers (COMs), and is simple and economical. The method of the invention produces ring opened cycloolefin polymers by using molybdenum catalysts that are readily available. The polymers are obtained in good yields, are readily soluble in common organic solvents, and are predominantly cis-oriented. The use of the catalysts according to the invention does not require any sophisticated equipment for experimental manipulations. For the ROMP of cycloolefin monomers according to the method of the invention, the catalysts include $MoOCl_4$ and other complexes such as $MoOCl_2(t-BuO)_2$ which are prepared from $MoOCl_4$. The catalysts are used in conjunction with a Lewis acid as a co-catalyst, and a chain transfer agent for controlling the molecular weight of the obtained polymer.

Another aspect of the invention provides a system and a method for the co-polymerization of NB and DCPD in which the two monomers are blended homogeneously, resulting in a polymer product characterized by a monomodal GPC (gel permeation chromatography) peak.

DESCRIPTION OF THE INVENTION

In the method of the present invention, cycloolefins are polymerized by utilizing as a catalyst a complex represented by the formula $MoOX_2L_2$ described below, wherein molybdenum has a +6 oxidation state, possesses an electron count of 12, and is penta-coordinated. Although the catalyst can achieve the ring opening of COMs independently, in the method of the present invention the performance of the catalyst is greatly enhanced by the use of specific Lewis acids as co-catalysts. A chain transfer agent (CTA) that aids in chain scission is also used in the method of the invention to tailor the final polymer product to have specific properties.

Specifically, the method of the present invention for ring opening metathesis polymerization of a cycloolefin monomer uses a polymerization system that comprises:

(a) $MoOX_2L_2$ as a catalyst, wherein the catalyst is at least one represented by the formula

wherein
(1) both of the X groups are the same halogen atom selected from the group consisting of Cl and Br, and both of the L groups are the same halogen atom as X; or
(2) both of the X groups are the same halogen atom selected from the group consisting of Cl and Br, and both of the L groups are the same straight chain or branched alkyl group having 1–4 carbon atoms; or
(3) both of the X groups are the same halogen atom selected from the group consisting of Cl and Br, and both of the L groups are the same straight chain or branched alkoxy group having 1–4 carbon atoms; or
(4) both of the X groups are the same alkyl group having 1–4 carbon atoms, and both of the L groups are the same alkoxy group having 1–4 carbon atoms; or
(5) one X group is a halogen atom selected from the group consisting of Cl and Br, and the other X group together with both of the L groups constitute a tridentate ligand; or
(6) one X group is a straight chain or branched alkoxy group having 1–4 carbon atoms, and the other X group together with both of the L groups constitute a tridentate ligand;

(b) a Lewis acid as a co-catalyst, wherein the Lewis acid is at least one selected from the group consisting of an alkyl aluminum compound, an alkoxy aluminum compound, a dialkyl-halo aluminum compound, and a dihalo-alkyl aluminum compound, wherein the alkyl group and the alkoxy group have 1–6 carbon atoms and the halogen is selected from the group consisting of Cl and Br;

(c) at least one chain transfer agent; and (d) at least one cycloolefin monomer;

wherein the molar ratio of the catalyst (a) to the monomer (d) is in the range 1:700 to 1:100,000.

Examples of the monodentate groups X or L in the $MoOX_2L_2$ catalyst are: chlorine, bromine, methyl, ethyl, n-propyl, isopropyl, butyl, t-butyl, methoxy, ethoxy, n-propoxy, isopropoxy, butoxy, t-butoxy, etc.

An example of the tridentate ligand in the $MoOX_2L_2$ catalyst is 2,6-bis(2-methyl-2-hydroxypropyl) pyridine.

The $MoOX_2L_2$ catalysts used in the polymerization system according to the invention may be synthesized, for example, by ligand substitution in a one-step synthesis from the commercially available $MoOCl_4$ complex and the starting materials for the desired ligands. In general, the formation of the molybdenum catalysts can be completed within a day, in most cases with percent yields which are good to excellent, typically greater than 90% in most instances. The reactions are sufficiently clean with practically no side products or competing reactions occurring simultaneously. The synthesis of the complex is generally carried out at ambient temperature inside an inert atmosphere glove-box with minimum constraints.

Examples of the catalysts are: $MoOCl_4$, $MoOCl_2(t-BuO)_2$ wherein t-Bu is tert-butyl, $MoO(Me)_2(t-BuO)_2$ wherein Me is methyl, $MoO(n-Bu)_2(t-BuO)_2$ wherein n-Bu is n-butyl, etc. $MoOCl_4$ and $MoOCl_2(t-BuO)_2$ are preferred catalysts for use in the polymerization system according to the invention because they are readily available, are easy to use and result in high yields. The $MoOCl_2(t-BuO)_2$ complex can be prepared by reacting $MoOCl_4$ with t-BuOK, according to the following reaction:

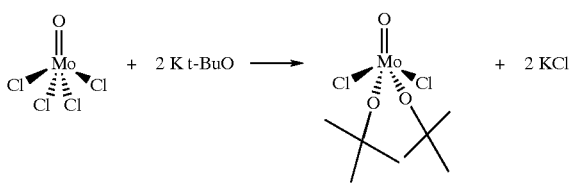

The Lewis acid used as a co-catalyst may be an alkyl aluminum compound, an alkoxy aluminum compound, a dialkyl-halo aluminum compound, or a dihalo-alkyl aluminum compound, wherein the alkyl group has 1–6 carbon atoms, preferably 1–3 carbon atoms. These Lewis acids are widely available commercially. The preferred Lewis acids are alkoxy aluminum compounds, also known as aluminoxanes, which have an oligomeric structure with repeating units of aluminoxane. The aluminoxane oligomers may be linear, cyclic, or a mixture of linear and cyclic oligomers, wherein the number of repeating units is from 2 to 50, preferably 15 to 30. The oligomeric aluminoxanes may be prepared by reaction of the corresponding alkyl aluminum compounds and water, or by other methods known in the art, such as reaction of the corresponding alkyl aluminum compounds with aluminum salts, preferably aluminum sulfate, containing water of hydration.

The amount of Lewis acid in the polymerization system is from 4 to 1,000, preferably from 10 to 100 parts of Lewis acid to 10,000 parts of the monomer on a molar equivalent basis.

The chain transfer agent is not particularly limited, and may be any chain transfer agent capable of controlling the molecular weight of the polymer to be in the desired range and distribution. The chain transfer agent may be any monomer that has a readily available β-hydrogen that can easily dissociate, for example, methyl methacrylate. The chain transfer agent may be also, for example, an α-olefin, specifically an α-olefin having from 2 to 12 carbon atoms.

The amount of the chain transfer agent in the polymerization system is from 4 to 1,000, preferably from 10 to 100 parts of chain transfer agent to 10,000 parts of the monomer on a molar equivalent basis.

The cycloolefin monomer which can be polymerized according to the method of the present invention is not particularly limited. Examples of the cycloolefin monomer include norbornene (NB) and compounds derived therefrom which contain a norbornyl group such as tetracyclododecene (TCD) and ethylidene TCD, as well as dicyclopentadiene (DCPD).

The polymerization system may contain one or more cycloolefin monomer. In one embodiment of the invention, the combination of norbornene and dicyclopentadiene is advantageously co-polymerized homogeneously to give a polymer product which exhibits a single peak in gel permeation chromatography (GPC).

The molar ratio of monomer to catalyst "[M]/[C]" in the polymerization system of the invention is in the range from a ratio of 1:700 to a ratio of 1:100,000 . A preferred range is from a ratio of 1:1,000 to a ratio of 1:20,000, most preferably from a ratio of 1:2,500 to a ratio of 1:25,000.

The following examples further illustrate aspects of the invention but do not limit the invention. Unless otherwise indicated, all parts, percentages, ratios, etc., in the examples and the rest of the specification are on the basis of weight.

EXAMPLES

In general, unless noted otherwise, all solvents used were distilled using appropriate drying agents and were degassed prior to use. All experimental manipulations were carried out under an argon atmosphere using standard Schlenk techniques or inside an inert atmosphere glove-box containing less than 1 ppm oxygen.

Synthesis of $MoOCl_2(t-BuO)_2$ complex

The $MoOCl_4$ complex (1.50 gm or 5.91 mmols) was charged into a 50 mL Schlenk flask equipped with a magnetic stirrer inside an inert atmosphere glove-box. To this complex was then added approximately 30 mL dry cyclohexane and the solution was allowed to stir for about 20 minutes. Next, t-BuOK (1.32 gm or 11.82 mmols) was carefully weighed out and added to this solution. The reaction was allowed to proceed inside the glove box at ambient temperature overnight. After 16 hours the stirring was stopped, the flask was removed from the glove box and the contents were filtered through a short plug of glass wool. The filtrate was evacuated under reduced pressure and the crude solid thus obtained was recrystallized using methylene chloride and heptane.

Polymerization of cycloolefin monomers

In the following examples, the polymerization was carried out in the following manner. The monomer (or monomers) was initially charged into a polymerization bottle. After injecting in the appropriate amount of the solvent, the catalyst, the co-catalyst (if used), and the chain transfer agent (if used) were added sequentially and the bottles were shaken to homogenize the mixture.

Example 1

Formation of Ring Opened Poly-DCPD using $MoOCl_4$/MAO/CTA (as Function of Temperature)

The ROMP of DCPD using the $MoOCl_4$ complex in conjunction with MAO as a co-catalyst and 1-hexene as a chain transfer agent was carried out at a [M]/[C] ratio of 10,000:1 at various temperatures. As the temperature was raised from ambient to 60° C., it was observed that the yield of the polymer also increased. At 50° C. and 60° C. the yield was practically quantitative. (Table 1)

TABLE 1

Polymerization of DCPD using $MoOCl_4$ with MAO and 1-hexene as a function of temperature

| Expt # | Ratio Mnmr:Cat:Co-cat:CTA | Time hr | Temp ° C. | Yield % |
|---|---|---|---|---|
| 1 | 10,000:1:100:100 | 6 | Ambient. | ~10 |
| 2 | " | " | 40 | >50 |
| 3 | " | " | 50 | ~90 |
| 4 | " | " | 60 | 100 |

Conditions of experiments:
Catalyst = ($MoOCl_4$) = 2 mg (7.88 × $10^{-3}$ mmols);
Monomer = (DCPD) = 10.4 gm for [M]/[C] ratio of 10,000:1;
Co-cat = (MAO) was a 10 wt % solution of which 100 μL was used;
CTA = 1-hexene = 30 mg;
Solvent = (Cyclohexane approximately 5 mL in each case).
Reactions were quenched by adding approximately 20 mL MeOH. The precipitated polymer was retrieved from the polymerization bottle and transferred into a centrifuge tube. After 15 minutes of centrifuging at 1500 rpm the supernatant liquids were discarded and the polymer dried on the vacuum line overnight.

Example 2

Formation of Ring Opened Poly-DCPD using $MoOCl_4$/MAO/CTA (as Function of [M]/[C] Ratio)

The following table shows the results of the polymerization of DCPD conducted at 60° C. at increasing [M]/[C] ratios (Experiments 1–3). In addition, Experiment 4 shows the results obtained at 70° C. at the same high [M]/[C] ratio as used in Experiment 3, which was conducted at a lower temperature of 60° C.

TABLE 2

Polymerization of DCPD using $MoOCl_4$ with MAO and 1-hexene as function of [M]/[C] ratio

| Expt # | Ratio Mnmr:Cat:Co-cat:CTA | Time hr | Temp ° C. | Yield % |
|---|---|---|---|---|
| 1 | 10,000:1:100:100 | 6 | 60 | ~100 |
| 2 | 25,000:1:100:100 | " | " | >95 |

TABLE 2-continued

Polymerization of DCPD using MoOCl$_4$ with MAO and 1-hexene as function of [M]/[C] ratio

| Expt # | Ratio Mnmr:Cat:Co-cat:CTA | Time hr | Temp ° C. | Yield % |
|---|---|---|---|---|
| 3 | 50,000:1:100:100 | " | " | ~20 |
| 4 | " | " | 70 | ~24 |

Conditions of experiments:
Catalyst = (MoOCl$_4$) 1 mg (3.94 × 10$^{-3}$ mmols);
Monomer = (DCPD) 5.2 gm for [M]/[C] ratio of 10,000:1; 13 gm for [M]/[C] ratio of 25,000:1; 26 gm for [M]/[C] ratio of 50,000:1;
Co-cat = (MAO) was a 10 wt % solution of which 100 μL was used;
CTA = 1-hexene = 30 mg;
Solvent = (Cyclohexane approximately 5 mL in each case).
Reactions were quenched by adding approximately 20 mL MeOH. The precipitated polymer was retrieved from the polymerization bottle and transferred into a centrifuge tube. After 15 minutes of centrifuging at 1500 rpm the supernatant liquids were discarded and the polymer dried on the high-vacuum line overnight.

Even at a [M]/[C] ratio of 25,000:1 the obtained yield was almost quantitative. When the ratio was further raised to 50,000:1, the overall yield decreased. At that high [M]/[C] ratio, when the temperature was raised to 70° C., the yield was increased slightly over that obtained at 60° C.

Example 3

Formation of Ring Opened Poly-DCPD using MoOCl$_2$(t-BuO)$_2$/MAO/1-hexene

The following table shows the results of the polymerization of DCPD at room temperature and two different [M]/[C] ratios, using the MoOCl$_2$(t-BuO)$_2$/MAO/1-hexene combination in the polymerization system.

TABLE 3

Polymerization of DCPD using MoOCl$_2$(t-BuO)$_2$/MAO/1-hexene at ambient temperature

| Expt # | Ratio Cat:Co-cat:CTA:Monomer | Time Hrs | Yield % |
|---|---|---|---|
| 1 | 1:0:100:1,000 | 4 | 60 |
| 2 | 1:4:100:5,000 | " | ~50 |

Conditions of experiments:
Catalyst = MoOCl$_2$(t-BuO)$_2$ = 2 mg (6.08 × 10$^{-3}$ mmoles);
Monomer = DCPD = 0.8 gm for 1000:1 [M]/[C] ratio; 4 gm for 5000:1 [M]/[C] ratio;
Co-catalyst = MAO = 200 μL of a 10 wt % solution in toluene.
The reaction quenched with MeOH and acetone. The precipitated polymer was retrieved from the polymerization bottle and transferred into a centrifuge tube. After 15 minutes of centrifuging at 1500 rpm the supernatant liquids were discarded and the polymer dried on the vacuum line overnight.

Example 4

Co-polymerization of NB and DCPD using MoOCl$_4$/MAO/1-hexene

The following table shows the results of the co-polymerization of NB with DCPD with the MoOCl$_4$/MAO/1-hexene combination in the polymerization system. Both the monomers were used at a 10,000 fold excess relative to the catalyst. The GPC of the resultant polymer was carried out. The chromatogram exhibited a single peak, indicating that both the monomers polymerized to form a homogeneous blend.

TABLE 4

Co-polymerization of NB and DCPD using MoOCl$_4$/MAO/1-hexene at 60° C.

| Expt # | Ratio NB:DCPD: MoOCl$_4$:MAO:1-hexene | Time hrs | Yield % | M$_w$ | PDI = M$_w$/M$_n$ |
|---|---|---|---|---|---|
| 1 | 10$^4$:10$^4$:1:10$^2$:10$^2$ | 6 | >97 | 2.2 × 10$^6$ | 1.3 |

Conditions of experiments:
Catalyst = (MoOCl$_4$) = 1 mg (3.94 × 10$^{-3}$ mmols);
Monomer = DCPD = 5.2 gm for a [M]/[C] ratio of 10,000:1, NB = 3.7 gm for a [M]/[C] ratio of 10,000:1;
Co-cat = (MAO) was a 10 wt % solution of which 100 μL was used;
CTA = 1-hexene = 40 mg;
Solvent = (Cyclohexane approximately 5 mL added prior to catalyst addition).
Reactions were quenched by exposing the polymerizing solution to air. The polymer was retrieved from the polymerization bottle and dissolved in approximately 25 mL THF to produce a 10 wt % polymer solution. The GPC samples were prepared by taking 1 mL of the 10 wt % polymer solution, diluted to form a 1 wt % solution. The PDI was compared to polystyrene standards.

Comparative Example 1

Formation of Ring Opened Poly-DCPD using MoOCl$_4$

Polymerization of DCPD was carried out by adding the MoOCl$_4$ complex dissolved in cyclohexane (Table 5). 10 mg of the MoOCl$_4$ complex was carefully weighed into a 10 mL volumetric flask and dissolved in cyclohexane solvent. 2 mL of this solution was used for every experiment. The [M]/[C] ratio was varied from 1,000:1 to 5,000:1. The polymerizations were conducted at ambient temperature. The solutions in all cases turned viscous when the polymerization was allowed to continue for over 2 hours. However, at a [M]/[C] ratio of 2,000:1, complete polymerization required 6 hours. At a ratio of 5,000:1, the yield was only 25% even though the polymerization was allowed to proceed for 6 hours.

TABLE 5

Polymerization of DCPD using MoOCl$_4$

| Expt # | Ratio Catalyst:Monomer | Time Hrs | Temperature ° C. | Yield % |
|---|---|---|---|---|
| 1 | 1:1,000 | 2 | Ambient | 100 |
| 2 | 1:2,000 | 6 | " | 100 |
| 3 | 1:5,000 | " | " | ~25 |

Conditions of experiments:
Catalyst = (MoOCl$_4$) = 2 mg (7.88 × 10$^{-3}$ mmols);
Monomer = (DCPD) = 1.04 gm for a [M]/[C] ratio of 1,000:1; 2.10 gm for a [M]/[C] ratio of 2,000:1; 5.2 gm for a [M]/[C] ratio of 5,000:1;
Solvent = (Cyclohexane approximately 8 mL in each case).
Reactions were quenched by adding MeOH. The precipitated polymer was retrieved from the polymerization bottle and transferred into a centrifuge tube. After 15 minutes of centrifuging at 1500 rpm the supernatant liquids were discarded and the polymer dried on the vacuum line overnight.

Comparative Example 2

Formation of Ring Opened Poly-DCPD using MoOCl$_4$/Lewis Acid

The following table shows the results of the ROMP of DCPD with the same molybdenum complex in the presence of various Lewis acids at room temperature after two hours. MAO gave a better yield than the aluminum alkyl and zinc alkyl compounds, whereas the polymerization with Me$_4$Sn and B(Ar$_f$)$_3$(i.e., pentafluorophenyl borate) resulted in only traces of the polymer.

TABLE 6

Polymerization of DCPD using MoOCl$_4$ with different Lewis acids

| Expt # | Catalyst | Co-catalyst | Ratio Cat:Co-cat:Monomer | Time Hrs | Temperature °C. | Yield % |
|---|---|---|---|---|---|---|
| 1 | MoOCl$_4$ | MAO | 1:4:5,000 | 2 | Ambient | >50 |
| 2 | " | Bu$_3$Al | " | " | " | ~15 |
| 3 | " | Et$_3$Al | " | " | " | ~10 |
| 4 | " | Et$_2$Zn | " | " | " | ~15 |
| 5 | " | Me$_4$Sn | " | " | " | Trace |
| 6 | " | B(Ar$_f$)$_3$ | " | " | " | Trace |

Conditions of experiments:
Catalyst = (MoOCl$_4$) = 2 mg (7.88 × 10$^{-3}$ mmols);
Monomer = (DCPD) = 2.10 gm for a [M]/[C] ratio of 2,000:1;
Co-cat = (MAO) was a 10 wt % solution of which 40 µL was used;
Bu$_3$Al (TIBAL ™) and Et$_3$Al (TEAL ™) were 25% wt solutions in toluene, of which 16 µL was used in each case;
Me$_4$Sn and Et$_2$Zn were 1.0 M solutions, of which four equivalents were used in each case;
B(Ar$_f$)$_3$ = 3% wt solution, of which 50 µL was used;
Solvent = (Cyclohexane approximately 8 mL in each case).
Reactions were quenched by adding approximately 20 mL MeOH. The precipitated polymer was retrieved from the polymerization bottle and transferred into a centrifuge tube. After 15 minutes of centrifuging at 1500 rpm the supernatant liquids were discarded and the polymer dried on the vacuum line overnight.

Comparative Example 3
Formation of Ring Opened Poly-DCPD using MoOCl$_4$/MAO at Ambient Temperature As shown above, under similar experimental conditions the performance of MAO was superior to those of the aluminum alkyl and zinc alkyl compounds. The following table shows the results of the polymerization of DCPD using the combination MoOCl$_4$/MAO at increasing larger [M]/[C] ratios. At a ratio of 1,000:1 and 2,000:1, the solutions started becoming viscous almost from the start. However, at the higher ratios of 5,000:1 and 10,000:1 the reactions were slower. The polymerizations were allowed to proceed for 2 hours for all the experiments and were then quenched with MeOH.

TABLE 7

Polymerization of DCPD at ambient temperature using MoOCl$_4$/MAO as a function of [M]/[C] ratio

| Expt # | Ratio Cat:Co-cat:Monomer | Time Hrs | Temperature °C. | Yield % |
|---|---|---|---|---|
| 1 | 1:4:1,000 | 2 | Ambient | 100 |
| 2 | 1:4:2,000 | " | " | 100 |
| 3 | 1:4:5,000 | " | " | >50 |
| 4 | 1:4:10,000 | " | " | ~10 |

Conditions of experiments:
Catalyst = (MoOCl$_4$) = 2 mg (7.88 × 10$^{-3}$ mmols);
Monomer = (DCPD) = 1.05 gm for [M]/[C] ratio of 1,000:1; 2.10 gm for [M]/[C] ratio of 2,000:1; 5.20 gm for [M]/[C] ratio of 5,000:1; 10.4 gm for [M]/[C] ratio of 10,000:1;
Co-cat = (MAO) was a 10 wt % solution, of which 40 µL was used;
Solvent = (Cyclohexane approximately 8 mL in each case).
Reactions were quenched by adding approximately 20 mL MeOH. The precipitated polymer was retrieved from the polymerization bottle and transferred into a centrifuge tube. After 15 minutes of centrifuging at 1500 rpm the supernatant liquids were discarded and the polymer dried on the vacuum line overnight.

Comparative Example 4
Formation of Ring Opened Poly-DCPD using MoOCl$_2$(t-BuO)$_2$ The following table shows the results of the polymerization of DCPD using the MoOCl$_2$(t-BuO)$_2$ complex without a co-catalyst or chain transfer agent.

TABLE 8

Polymerization of DCPD using MoOCl$_2$(t-BuO)$_2$ at ambient temperature

| Expt # | Catalyst | Ratio Cat:Monomer | Time hrs | Temperature °C. | Yield % |
|---|---|---|---|---|---|
| 1 | MoOCl$_2$(t-BuO)$_2$ | 1:1,000 | 4 | Ambient | ~15 |
| 2 | " | 1:5,000 | " | " | 5 |

Conditions of experiments:
Catalyst = MoOCl$_2$(t-BuO)$_2$ = 2 mg (6.08 × 10$^{-3}$ mmols);
Monomer = DCPD = 0.8 gm for [M]/[C] ratio of 1000:1    4 gm for [M]/[C] ratio of 5000:1;
Solvent = cyclohexane = 5 mL in each case.
Reactions were quenched by adding MeOH. The precipitated polymer was retrieved from the polymerization bottle and transferred into a centrifuge tube. After 15 minutes of centrifuging at 1500 rpm the supernatant liquids were discarded and the polymer dried on the vacuum line overnight.

Comparative Example 5
Formation of Ring Opened Poly-DCPD using WOCl$_4$ in the presence and Absence of MAO and a CTA Table 9 shows the results obtained when the tungsten complex WOCl$_4$ which is analogous to MoOCl$_4$ was used in the polymerization of DCPD, both in the presence of MAO and 1-hexene, and in their absence.

TABLE 9

Polymerization of DCPD using WOCl$_4$ in the absence and presence of MAO and 1-hexene

| Expt # | Catalyst | Co-catalyst | Monomer | Ratio Cat:CTA:Co-cat:DCPD | Time hrs | Temp °C. | Yield % |
|---|---|---|---|---|---|---|---|
| 1 | WOCl$_4$ | — | DCPD | 1:100:0:1,000 | 8 | 60 | 0 |
| 2 | " | MAO | " | 1:100:100:1,000 | " | " | ~70 |
| 3 | " | " | " | 1:100:100:2,000 | " | " | ~70 |
| 4 | " | " | " | 1:100:100:5,000 | " | " | >30 |

Conditions of experiments:
Catalyst = (WOCl$_4$) = 1 mg in each case;
1-hexene ~ 20–30 mg in each case;
Co-catalyst = MAO = 100 µL of a 10 wt. solution in toluene;
Monomer = DCPD = 387 mg for Expt #1; 773 mg for Expt #2; and 1.95 gm for Expt #3;
Solvent = cyclohexane (4 mL).
The reaction was quenched by addition of MeOH. The precipitated polymer was centrifuged and collected, dried on the high-vacuum line and weighed. Dissolution of the polymers was attempted in THF and toluene.

As seen from Table 9, the WOCl$_4$ complex was not able to initiate the ROMP of DCPD independently. In the presence of MAO the activity was improved. However, the yield obtained was significantly poorer than the yield obtained under the same conditions with the molybdenum catalysts used in the method of the invention.

Other embodiments of the present invention will be apparent to those skilled in the art from consideration of the specification and practice of the invention disclosed herein. It is intended that the specification and examples be considered as illustrative only, with the true scope and spirit of the invention being indicated by the following claims.

What is claimed is:

1. A polymerization system for the metathesis polymerization of a cycloolefin monomer, comprising:

(a) MoOX$_2$L$_2$ as a catalyst, wherein the catalyst is at least one represented by the formula

wherein
(1) both of the X groups are the same halogen atom selected from the group consisting of Cl and Br, and both of the L groups are the same halogen atom as X; or
(2) both of the X groups are the same halogen atom selected from the group consisting of Cl and Br, and both of the L groups are the same straight chain or branched alkyl group having 1–4 carbon atoms; or
(3) both of the X groups are the same halogen atom selected from the group consisting of Cl and Br, and both of the L groups are the same straight chain or branched alkoxy group having 1–4 carbon atoms; or
(4) both of the X groups are the same alkyl group having 1–4 carbon atoms, and both of the L groups are the same alkoxy group having 1–4 carbon atoms; or
(5) one X group is a halogen atom selected from the group consisting of Cl and Br, and the other X group together with both of the L groups constitute a tridentate ligand; or
(6) one X group is a straight chain or branched alkoxy group having 1–4 carbon atoms, and the other X group together with both of the L groups constitute a tridentate ligand;

(b) a Lewis acid as a co-catalyst, wherein the Lewis acid is at least one selected from the group consisting of an alkyl aluminum compound, an alkoxy aluminum compound, a dialkyl-halo aluminum compound, and a dihalo-alkyl aluminum compound, wherein the alkyl group and the alkoxy group have 1–6 carbon atoms and the halogen is selected from the group consisting of Cl and Br;
(c) at least one chain transfer agent; and
(d) at least one cycloolefin monomer;
wherein the molar ratio of the catalyst (a) to the monomer (d) is in the range from 1:700 to 1:100,000.

2. A polymerization system as in claim 1, wherein both of the X groups are the same halogen atom, and both of the L groups are the same halogen atom as X in the catalyst.

3. A polymerization system as in claim 2, wherein the catalyst is $MoOCl_4$.

4. A polymerization system as in claim 1, wherein both of the X groups are the same halogen atom selected from the group consisting of Cl and Br, and both of the L groups are the same straight chain or branched alkyl group having 1–4 carbon atoms in the catalyst.

5. A polymerization system as in claim 4, wherein the catalyst is $MoOCl_2(Me)_2$.

6. A polymerization system as in claim 1, wherein both of the X groups are a halogen atom, and both of the L groups are a straight chain or branched alkoxy group having 1–4 carbon atoms in the catalyst.

7. A polymerization system as in claim 6, wherein the catalyst is $MoOCl_2(t\text{-}BuO)_2$.

8. A polymerization system as in claim 1, wherein both of the X groups are the same alkyl group having 1–4 carbon atoms, and both of the L groups are the same alkoxy group having 1–4 carbon atoms in the catalyst.

9. A polymerization system as in claim 8, wherein the catalyst is $MoO(Me)_2(O\ t\text{-}Bu)_2$.

10. A polymerization system as in claim 1, wherein one X group is a halogen atom, and the other X group together with both of the L groups constitute a tridentate ligand in the catalyst.

11. A polymerization system as in claim 10, wherein the tridentate ligand is 2,6-bis(2-methyl-2-hydroxypropyl) pyridine.

12. A polymerization system as in claim 1, wherein one X group is a straight chain or branched alkoxy group having 1–4 carbon atoms, and the other X group together with both of the L groups constitute a tridentate ligand in the catalyst.

13. A polymerization system as in claim 12, wherein the tridentate ligand is 2,6-bis(2-methyl-2-hydroxypropyl) pyridine.

14. A polymerization system as in claim 1, wherein the co-catalyst is methyl aluminoxane.

15. A polymerization system as in claim 1, wherein the chain transfer agent is an $\alpha$-olefin having 2–12 carbon atoms.

16. A polymerization system as in claim 1, wherein the chain transfer agent is an $\alpha$-olefin having 5–10 carbon atoms.

17. A polymerization system as in claim 1, wherein the monomer is norbornene.

18. A polymerization system as in claim 1, wherein the monomer is dicyclopentadiene.

19. A polymerization system as in claim 1, wherein the monomer is a mixture of norbornene and dicyclopentadiene.

20. A polymerization system as in claim 1, wherein the molar ratio of the catalyst (a) to the monomer (d) is in the range from 1:1,000 to 1:20,000.

21. A polymerization system as in claim 1, wherein the ratio of the co-catalyst (b) to the monomer (d) is in the range from 4 to 1,000 parts of co-catalyst to 10,000 parts of monomer on a molar equivalent basis.

22. A polymerization system as in claim 1, wherein the ratio of the chain transfer agent (c) to the monomer (d) is in the range from 4 to 1,000 parts of chain transfer agent to 10,000 parts of monomer on a molar equivalent basis.

23. A method for the metathesis polymerization of a cycloolefin monomer, comprising the step of conducting the polymerization in a polymerization system which comprises:
(a) $MoOX_2L_2$ as a catalyst, wherein the catalyst is at least one represented by the formula

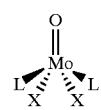

wherein
(1) both of the X groups are the same halogen atom selected from the group consisting of Cl and Br, and both of the L groups are the same halogen atom as X; or
(2) both of the X groups are the same halogen atom selected from the group consisting of Cl and Br, and both of the L groups are the same straight chain or branched alkyl group having 1–4 carbon atoms; or
(3) both of the X groups are the same halogen atom selected from the group consisting of Cl and Br, and both of the L groups are the same straight chain or branched alkoxy group having 1–4 carbon atoms; or
(4) both of the X groups are the same alkyl group having 1–4 carbon atoms, and both of the L groups are the same alkoxy group having 1–4 carbon atoms; or (5) one X group is a halogen atom selected from the group consisting of Cl and Br, and the other X group together with both of the L groups constitute a tridentate ligand; or (6) one X group is a straight chain or branched alkoxy group having 1–4 carbon atoms, and the other X group together with both of the L groups constitute a tridentate ligand;

(b) a Lewis acid as a co-catalyst, wherein the Lewis acid is at least one selected from the group consisting of an alkyl aluminum compound, an alkoxy aluminum compound, a dialkyl-halo aluminum compound, and a dihalo-alkyl aluminum compound, wherein the alkyl group and the alkoxy group have 1–6 carbon atoms and the halogen is selected from the group consisting of Cl and Br;

(c) at least one chain transfer agent; and (d) at least one cycloolefin monomer;

wherein the molar ratio of the catalyst (a) to the monomer (d) is in the range from 1:700 to 1: 100,000.

24. A method for polymerization as in claim 23, wherein both of the X groups are the same halogen atom, and both of the L groups are the same halogen atom as X in the catalyst.

25. A method for polymerization as in claim 24, wherein the catalyst is $MoOCl_4$.

26. A method for polymerization as in claim 23, wherein both of the X groups are the same halogen atom selected from the group consisting of Cl and Br, and both of the L groups are the same straight chain or branched alkyl group having 1–4 carbon atoms in the catalyst.

27. A method of polymerization as in claim 26, wherein the catalyst is $MoOCl_2(Me)_2$.

28. A method for polymerization as in claim 23, wherein both of the X groups are a halogen atom, and both of the L groups are a straight chain or branched alkoxy group having 1–4 carbon atoms in the catalyst.

29. A method for polymerization as in claim 28, wherein the catalyst is $MoOCl_2(t\text{-BuO})_2$.

30. A method for polymerization as in claim 23, wherein both of the X groups are the same alkyl group having 1–4 carbon atoms, and both of the L groups are the same alkoxy group having 1–4 carbon atoms in the catalyst.

31. A method for polymerization as in claim 30, wherein the catalyst is $MoO(Me)_2(O\ t\text{-BU})_2$.

32. A method for polymerization as in claim 23, wherein one X group is a halogen atom, and the other X group together with both of the L groups constitute a tridentate ligand in the catalyst.

33. A method for polymerization as in claim 32, wherein the tridentate ligand is 2,6bis(2-methyl-2-hydroxypropyl)pyridine.

34. A method for polymerization as in claim 23, wherein one X group is a straight chain or branched alkoxy group having 1–4 carbon atoms, and the other X group together with both of the L groups constitute a tridentate ligand in the catalyst.

35. A method for polymerization as in claim 34, wherein the tridentate ligand is 2,6bis(2-methyl-2-hydroxypropyl)pyridine.

36. A method for polymerization as in claim 23, wherein the co-catalyst is methyl aluminoxane.

37. A method for polymerization as in claim 23, wherein the chain transfer agent is an α-olefin having 2–12 carbon atoms.

38. A method for polymerization as in claim 23, wherein the chain transfer agent is an α-olefin having 5–10 carbon atoms.

39. A method for polymerization as in claim 23, wherein the monomer is norbornene.

40. A method for polymerization as in claim 23, wherein the monomer is dicyclopentadiene.

41. A method for polymerization as in claim 23, wherein the monomer is a mixture of norbornene and dicyclopentadiene.

42. A method for polymerization as in claim 23, wherein the molar ratio of the catalyst (a) to the monomer (d) is in the range in the range from 1:1,000 to 1:20,000.

43. A method for polymerization as in claim 23, wherein the ratio of the co-catalyst (b) to the monomer (d) is in the range from 4 to 1,000 parts of co-catalyst to 10,000 parts of monomer on a molar equivalent basis.

44. A method for polymerization as in claim 23, wherein the ratio of the chain transfer agent (c) to the monomer (d) is in the range from 4 to 1,000 parts of chain transfer agent to 10,000 parts of monomer on a molar equivalent basis.

* * * * *